United States Patent
DePaso et al.

(10) Patent No.: US 8,123,021 B2
(45) Date of Patent: Feb. 28, 2012

(54) METHODS FOR SINGULATING ABUTTING ARTICLES

(75) Inventors: Joseph M. DePaso, River Ridge, LA (US); Felix H. Lapeyre, III, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 143 days.

(21) Appl. No.: 12/672,047

(22) PCT Filed: Aug. 27, 2007

(86) PCT No.: PCT/US2007/076887
§ 371 (c)(1),
(2), (4) Date: Feb. 3, 2010

(87) PCT Pub. No.: WO2009/029091
PCT Pub. Date: Mar. 5, 2009

(65) Prior Publication Data
US 2011/0114448 A1 May 19, 2011

(51) Int. Cl.
*B65G 47/10* (2006.01)
(52) U.S. Cl. .................................... 198/370.09
(58) Field of Classification Search .......... 198/779, 198/370.09, 598, 850, 853
See application file for complete search history.

(56) References Cited

U.S. PATENT DOCUMENTS

| | | |
|---|---|---|
| 5,701,989 A | 12/1997 | Boone et al. |
| 6,390,277 B2 | 5/2002 | Pelka |
| 6,412,621 B1 | 7/2002 | DeVree et al. |
| 6,494,312 B2 | 12/2002 | Costanzo |
| 6,571,937 B1 | 6/2003 | Costanzo et al. |
| 6,758,323 B2 | 7/2004 | Costanzo |
| 6,923,309 B2 | 8/2005 | Costanzo |
| 6,968,941 B2 | 11/2005 | Fourney |
| 7,007,792 B1 | 3/2006 | Burch |
| 7,073,651 B2 | 7/2006 | Costanzo et al. |
| 7,111,722 B2 | 9/2006 | Burch |
| 7,191,894 B2 | 3/2007 | Costanzo et al. |
| 7,249,669 B2 | 7/2007 | Fourney |
| 7,284,653 B2 | 10/2007 | Fourney et al. |
| 7,731,010 B2 * | 6/2010 | Kissee et al. ............. 198/370.09 |
| 2008/0302634 A1 | 12/2008 | Costanzo et al. |
| 2009/0200139 A1 | 8/2009 | Kissee et al. |

* cited by examiner

*Primary Examiner* — James R Bidwell
(74) *Attorney, Agent, or Firm* — James T. Cronvich

(57) ABSTRACT

Methods for singulating laterally abutting conveyed articles in a conveyor (60). The method includes separating laterally abutting articles by means of a first conveyor section (62) having in-line rollers (64) or oblique rollers rotating at a first speed in a conveying direction (70) and a second laterally adjacent conveyor section (63) having oblique rollers (65) rotating at a second speed in a direction causing articles atop the oblique rollers (65) in the second section (63) to diverge from articles atop the rollers in the first section. Differing the roller speeds helps the abutting articles to increase their separation in the conveying direction.

19 Claims, 5 Drawing Sheets

METHODS FOR SINGULATING ABUTTING ARTICLES

BACKGROUND

The invention relates generally to power-driven conveyors and, more particularly, to methods for operating conveyors to separate and singulate abutting conveyed articles.

Singulating conveyors are used to convey articles in a single file so that the articles can be individually processed. One conventional way of singulating articles is to cascade a series of centering conveyors having article-supporting rollers on opposite sides of the conveyor rotating in converging directions to direct articles toward a lateral position across the width of the conveyor. Each successive centering conveyor operates at a faster speed to increase the separation between consecutive articles. But some articles, such as boxes, have a tendency to remain in frictional contact with each other, especially if they are laterally abutting along long sides. The conventional centering conveyors are not always able to separate laterally abutting boxes.

Thus, there is a need for a method of separating laterally abutting conveyed articles so that they can be singulated.

SUMMARY

This need is satisfied by methods for singulating laterally abutting conveyed articles in a conveyor embodying features of the invention. One such method comprises: (a) feeding laterally abutting articles onto an upstream portion of a first conveyor segment divided across its width into a first conveyor section having article-supporting rollers rotating to direct supported articles downstream in a first direction and a second conveyor section having article-supporting rollers rotating to direct supported articles in a second direction downstream and away from the first conveyor section toward a first side of the conveyor; and (b) rotating the rollers in the first conveying section at a first velocity having a downstream component of velocity in a general conveying direction and rotating the rollers in the second conveying section at a second velocity having a downstream component of velocity, wherein the first direction diverges from the second direction.

In another aspect of the invention, such a method comprises: (a) feeding laterally abutting articles onto an upstream portion of a first conveyor segment divided across its width into a first conveyor section having article-supporting rollers arranged to rotate in a first direction and a second conveyor section having article-supporting rollers arranged to rotate in a second direction oblique to the first direction, downstream and away from the first conveyor section toward a first side of the conveyor; and (b) separating laterally abutting articles by directing those articles on the second conveyor section toward the first side of the conveyor and with a downstream speed less than the downstream speed of those articles on the first conveyor section.

In yet another aspect of the invention, a method for singulating laterally abutting articles conveyed downstream along a conveyor comprises: (a) conveying articles in a general conveying direction on a first diverging roller conveyor segment having article-supporting rollers arranged to direct some of the articles toward the first side of the conveyor and away from the other articles; and (b) conveying the articles on a centering roller conveyor segment downstream of the first diverging roller conveyor segment having article-supporting rollers arranged to merge the articles along an axis between the first and second sides of the conveyor.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
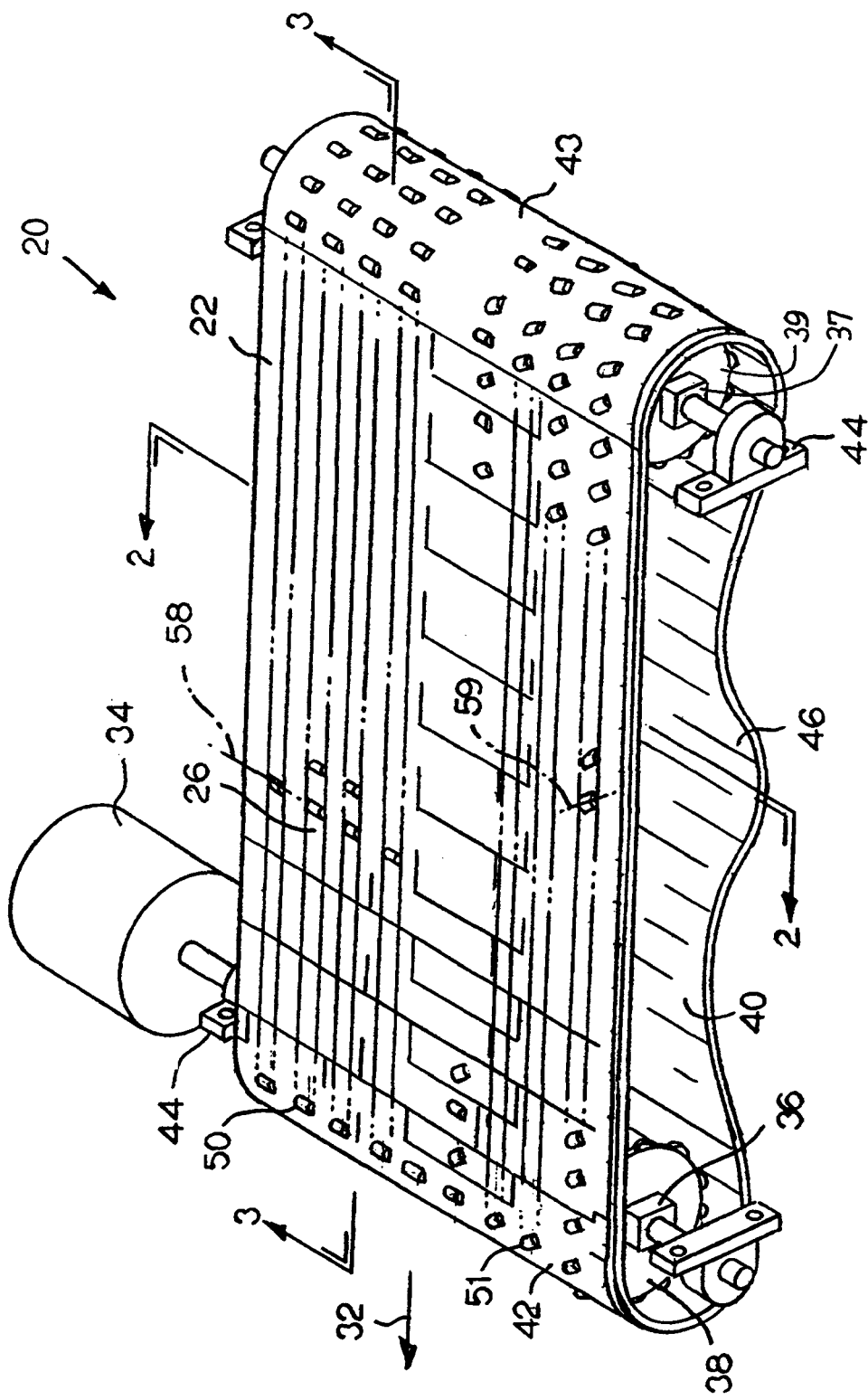
FIG. 1 is an axonometric view a belt conveyor useful in carrying out the methods of the invention.
Figure 2:
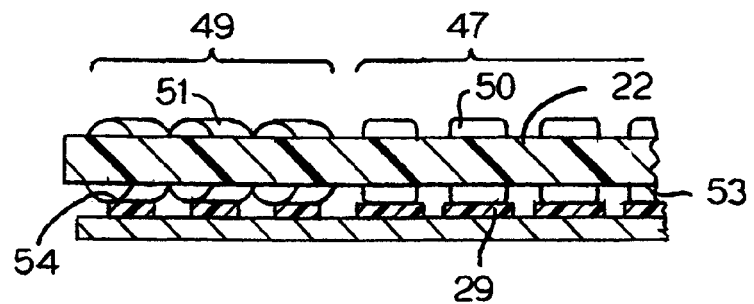
FIG. 2 is a partial cross section of the belt conveyor of FIG. 1 taken along lines 2-2.
Figure 3:
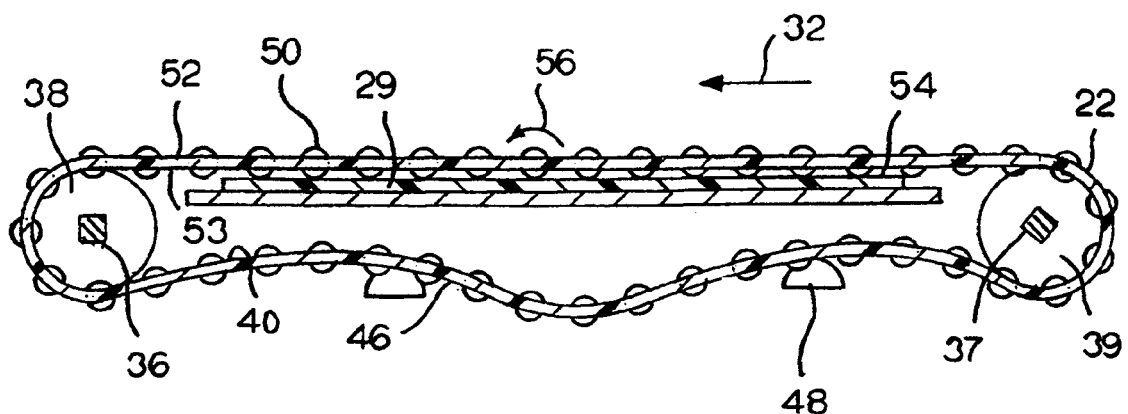
FIG. 3 is a cross section of the belt conveyor of FIG. 1 taken along lines 3-3.

One version of a conveyor for helping to singulate laterally abutting conveyed articles according to the method of the invention is the belt conveyor shown in FIGS. 1-3. The conveyor 20 includes an endless conveyor belt 22 having an upper conveying surface 26 along which articles are conveyed. The upper conveying surface of the belt is supported on a carryway that includes support members, such as wearstrips 29, or equivalently, a wear sheet spanning the width and length of the carryway. The conveyor belt is driven in a conveying direction 32 by a drive including a motor 34 coupled to a drive shaft 36. Sprockets 38 mounted on the drive shaft engage drive surfaces on the inner sides 40 of the belt at a downstream end 42 of the carryway. The belt is trained between the drive sprockets 38 and idle sprockets 39 at an upstream end 43 of the carryway. The idle sprockets are mounted on an idle shaft 37. Both shafts are supported for rotation in bearing blocks 44 at each end, which are mounted in a conveyor frame (not shown). The belts are supported and their sag is reduced along a lower returnway 46 by rollers or shoes 48.

The conveyor belt 22 has two sets of rollers 50, 51 with diameters that exceed the thickness of the belt. Salient portions of the rollers extend past top and bottom sides 52, 53 of the belt. The salient portions of the rollers 50, 51 ride along roller-engagement bearing surfaces 54 formed by the flat top sides of the support members—wearstrips 29, in this example. The rollers engage the bearing surfaces as the belt advances and rotate in the direction indicated by the arrow 56 in FIG. 3. The rollers 50 in a first conveying section 47 at one side of the belt are arranged to rotate on lateral axes 58 (90° from the conveying direction). These rollers 50 are referred to as in-line rollers because they rotate in and push conveyed articles parallel to the main conveying direction, i.e., the direction of belt travel 32. The rollers 51 in a laterally offset second conveying section 49 nearer the other side of the belt 22 are arranged to rotate on axes 59 oblique to the conveying direction and to the axes of the in-line rollers. For example, the axes of the rollers could be 30° off the lateral axes of the in-line rollers. These rollers 51 are referred to as oblique rollers. As the belt advances, each roller applies a force to an article conveyed atop it in a direction perpendicular to the roller's axis. Thus, the in-line rollers 50 push the article in the conveying direction 32, and the oblique rollers 51 push the article obliquely toward its side of the conveyor away from the first conveying section 47. Alternatively, the conveyor could be realized as two individual side-by-side belts: one with the in-line rollers and the other with the oblique rollers.

As the belt advances, the rollers rotate in the directions indicated. If the rollers do not slip as they rotate on the bearing surfaces, the tops of the in-line rollers 50 will have a velocity with a speed in the direction of belt travel and relative to the conveying surface equal to the belt speed. The tops of the oblique rollers 51 will also have a velocity component in the direction of belt travel equal to the belt speed and to the speed of the in-line rollers. The tops of the oblique rollers will, of course, also have a lateral component of velocity whose magnitude depends on the rollers' angle of obliqueness. In high-speed operation of the belt, however, the oblique rollers, because of their oblique orientation, will experience more sliding than the in-line rollers as they are dragged along the bearing surface by the belt's advance. The sliding decreases the rotational speed of the rollers. The result is that the velocity component in the direction of belt travel of the in-line rollers, which inherently slip less than the oblique rollers, is greater than the oblique rollers' velocity component in the direction of belt travel. And the greater the angle of the oblique rollers' orientation, the greater is the slip. With two side-by-side belts, each could alternatively be mounted on separate drive and idle shafts and driven at different speeds to achieve different roller velocities from one belt to the other.

Figure 4:
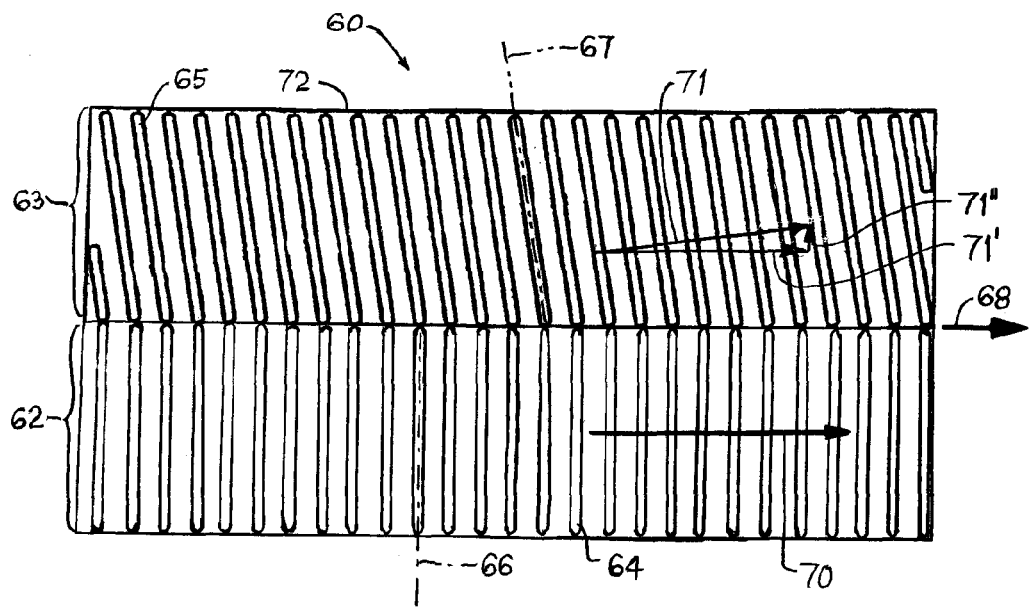
FIG. 4 is a top plan view of a powered-roller conveyor useful in carrying out the methods of the invention.

FIG. 4 shows a live- or powered-roller conveyor that may be used to practice the method of the invention. The conveyor 60 is divided widthwise into a first conveying section 62 having in-line rollers 64 arranged to rotate on first axes 66 perpendicular to the conveying direction 68 and an adjacent second conveying section 63 having oblique rollers 65 arranged to rotate on oblique second axes 67. Unlike belt rollers, which advance with the belt, the rollers in powered-roller conveyors are stationary, their positions along the conveyor fixed. The in-line article-supporting rollers 64 are conventionally powered by a belt or band to rotate to propel articles atop the rollers in the direction given by arrow 70 at a speed proportional to the length of the arrow. The oblique rollers 65 are driven by a separate drive mechanism or the same drive mechanism as the in-line rollers arranged to propel articles in the direction of arrow 71 at a speed proportional to the length of the arrow such that the oblique rollers' component of velocity 71' in the conveying direction 68 is less than the speed of the in-line rollers. (The oblique rollers' lateral component of velocity 71" directs articles conveyed atop the oblique rollers to the side 72 of the conveyor opposite the in-line-roller conveying section.)

Figure 5:
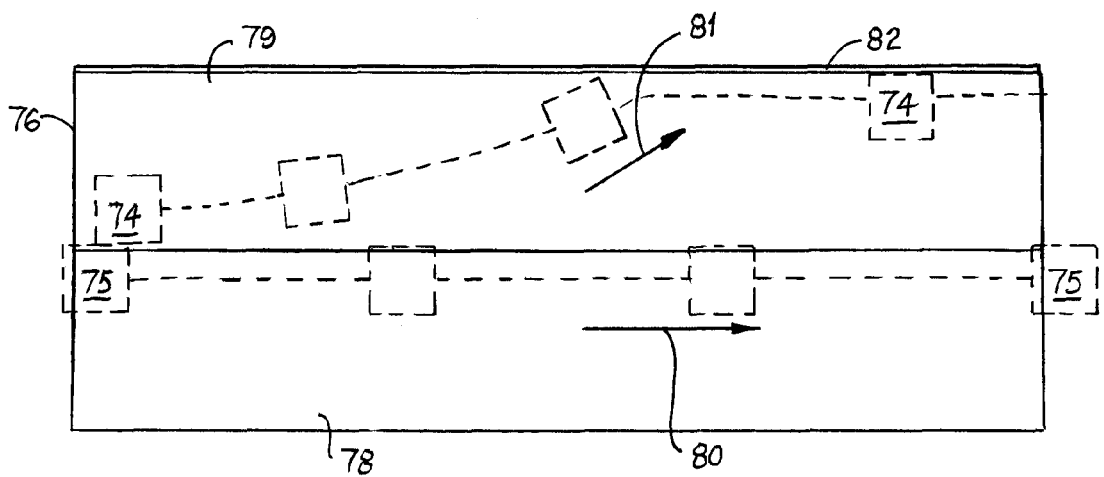
FIG. 5 is a top plan schematic representation of the belt conveyor of FIG. 1 and the powered-roller conveyor of FIG. 4 showing how it separates laterally abutting boxes.

The method of operation of the diverging roller conveyor of FIG. 1 or 4 is shown in FIG. 5. Two laterally abutting articles 74, 75 are fed onto the upstream end 76 of the conveyor atop in-line rollers in a first conveying section 78 and oblique rollers in an adjacent second conveying section 79. Arrows 80 and 81 indicate the relative velocities (magnitude and direction) of the tops of the rollers in each conveying section. As the coupled articles engage the rollers in each conveying section, article 74, which is shown resting in the oblique-roller section is rotated and diverted toward a side wall 82 bordering the outer side of the second conveying section. (The downstream speed of articles could be slowed by their frictional contact with the side wall. Increasing the side-wall friction by making it out of a higher-friction material is another way of controlling the speed of the articles in the oblique-roller section.) Article 75, which lies largely atop the rollers in the in-line section, is sped ahead of article 74 by the greater downstream speed of the in-line rollers. Because few of the oblique rollers engage article 75, it continues to proceed in the conveying direction. If the article was atop more of the oblique rollers, it would eventually be drawn onto the second conveying section, but not before it has been separated from and advanced ahead of its former mate, article 74. The paths of the two articles are shown with the articles depicted in their approximate orientations and positions on the conveyor at four different times to demonstrate the operation of the diverging roller conveyor. The initial divergence of the paths indicates the effectiveness of the conveyor in separating the abutting articles and eliminating their further mutual frictional interaction, which could cause jamming in narrower conveyors or in the case of larger or more abutting articles.

Figure 6:
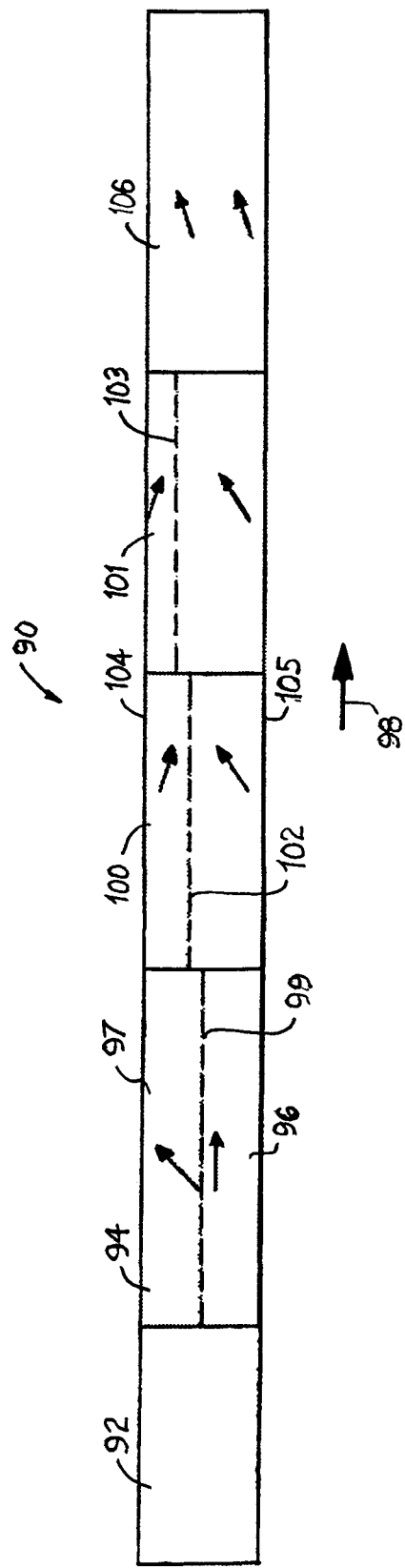
FIG. 6 is a top plan schematic representation of a singulating conveyor useful in carrying out the methods of the invention and incorporating the belt conveyor of FIG. 1 or the powered-roller conveyor of FIG. 4.

The diverging roller conveyor whose operation is illustrated in FIG. 5 could be further used as part of a longer conveyor, such as the exemplary singulating conveyor system shown in FIG. 6. (The arrows on the conveyor segments indicate the direction of rotation of the rollers in that portion of the conveyor.) The conveyor 90 has an infeed conveyor 92 at an upstream end feeding a scrambled mass of articles onto a first diverging roller conveyor 94, such as one that operates according to the principles of FIG. 5. The infeed conveyor may be a flat or modular plastic conveyor belt or a roller or slat conveyor running at, for example, 90 ft/min. The articles are initially separated and partly singulated in the first diverging roller conveyor that may be running at 140 ft/min to help increase separation from the upstream pack. The first diverging roller conveyor is shown divided across its width into an in-line-roller conveying section 96 and an oblique-roller conveying section 97 whose rollers are oriented 30° from the orientation of the in-line rollers. The in-line rollers rotate faster in the downstream conveying direction 98 than the oblique rollers as indicated by the arrows. The demarcation between the two sections is indicated as the centerline 99 of the conveyor segment, but could be offset laterally toward either side of the conveyor. Two centering conveyors 100, 101 are cascaded downstream of the first diverging roller conveyor segment 94. As indicated by the arrows and the demarcation line in the upstream-most centering conveyor 100, it has two side-by-side conveyor sections with oblique rollers arranged to rotate in directions, for example, ±30° off in-line, to cause conveyed articles to converge toward a lateral position indicated by the demarcation line 102, which forms a merge axis parallel to the general conveying direction. This centering conveying segment serves to further increase the separation between consecutive articles received from the first conveying segment by running at a faster forward speed, such as about 200 ft/min. The centering segment also tends to align the articles in a single file along the demarcation line 102, which is shown closer to the left-hand side 104 than to the right-hand side 105 of the conveyor. The following centering conveyor segment 101 runs even faster than the preceding one at, for example, about 225 ft/min to effect even greater article separation through acceleration from one segment to the next. Its line of demarcation between the two oblique-roller sections is even closer to the left-hand side than in the preceding segment. The final conveying segment shown is a registration conveyor 106 that has, for example, 30° oblique rollers arranged to push all the conveyed articles in registration against the left-hand side of the conveyor. This stepping of the lateral singulation position along the cascaded segments helps ensure a complete singulation of the articles against the left-hand side of the conveyor with adequate separation, but stepping is not necessary in all applications.

Figure 7:
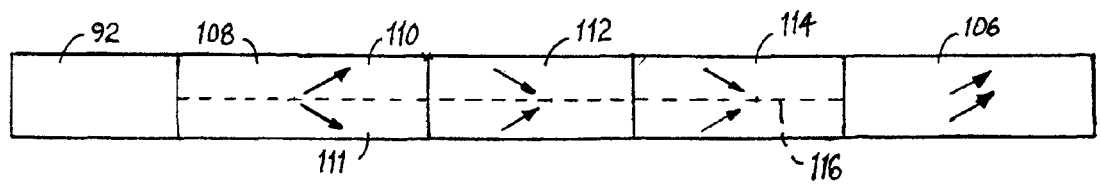
FIGS. 7-9 are top plan schematic representations of other conveyor roller configurations useful in carrying out the methods of the invention.
Figure 8:
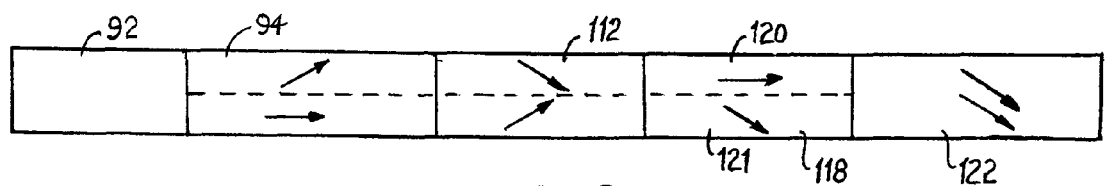
Figure 9:
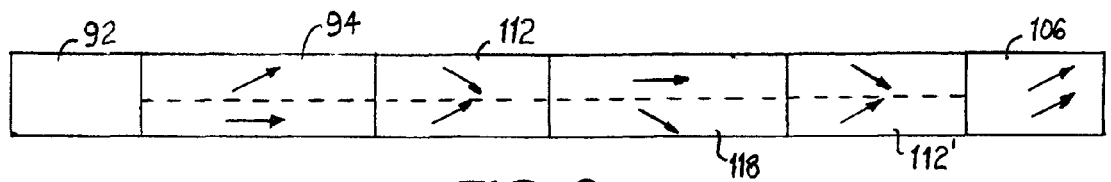

Singulating conveyors having other roller configurations are illustrated in FIGS. 7-9. In FIG. 7, the infeed conveyor 92 feeds articles onto a diverging roller conveyor segment 108 having side-by-side oblique-roller sections 110, 111. Like the oblique rollers in the centering conveyor segments 100, 101 of FIG. 6, the oblique rollers may be arranged as mirror images of each other, but directed outward instead of inward. They could also be rotated at the same speed, which would produce velocities that differ in direction but not in magnitude. Downstream centering conveyor segments 112 and 114, which would typically be operated at successively higher speeds to increase separation, are similar to the corresponding segments in FIG. 6, except that they are shown without the stepping of the line of demarcation 116 between the differently directed roller sections. The final segment 106 is a registration conveyor segment that aligns the articles against the left-hand side of the conveyor.

The singulating conveyor in FIG. 8 has a diverging roller segment 94 as in the conveyor of FIG. 6 followed by a centering conveyor segment 112 as in FIG. 7. Following the centering segment is a second diverging segment 118 whose rollers are configured to speed articles in the left-hand section 120 in the conveying direction and articles in the right-hand section 121 toward the right-hand side of the conveyor at a slower speed in the conveying direction. Because the second diverging roller segment directs articles toward the opposite side of the conveyor than does the first diverging roller segment, it can be helpful in separating abutting packages that the first diverging roller segment could not successfully separate because of how the packages happened to have been arranged. The articles are then received on a registration conveyor 122, whose oblique rollers are oriented to direct articles into alignment along the right-hand side of the conveyor.

The conveyor illustrated in FIG. 9 is similar to the conveyor of FIG. 8, except that a second centering segment 112' is inserted between the second diverging segment 118 and the registration conveyor 106, which, in this example, directs separated articles toward the left-hand side instead.

Although the invention has been described in detail with a few preferred versions, other versions are possible. For example, the oblique rollers were shown on angles of 30° only, but they could be oriented on other angles. As another example, the speeds of the successive conveyor segments given for the example of FIG. 5 were for descriptive purposes only and not by way of limitation. So, as these examples suggest, the details were provided as examples of different ways of practicing the invention and not by way of limiting the scope of the claims to those details.

What is claimed is:

1. A method for singulating laterally abutting conveyed articles in a conveyor, comprising:
   feeding laterally abutting articles onto an upstream portion of a first conveyor segment divided across its width into a first conveyor section having article-supporting rollers rotating to push supported articles downstream in a first direction and a second conveyor section having article-supporting rollers rotating to push supported articles in a second direction downstream and away from the first conveyor section toward a first side of the conveyor;
   rotating the rollers in the first conveying section at a first velocity having a downstream component of velocity in a general conveying direction and rotating the rollers in the second conveying section at a second velocity having a downstream component of velocity, wherein the first direction diverges from the second direction.

2. The method of claim 1 wherein the first direction is in the general conveying direction and wherein the second velocity has a lateral component of velocity and a downstream component of velocity less than the downstream component of the first velocity.

3. The method of claim 1 wherein the rollers in the first conveyor segment are advanced in the conveying direction at the same speed.

4. The method of claim 1 wherein the rollers in the first conveyor segment are stationary.

5. The method of claim 1 further comprising centering conveyed articles at preselected positions across the width of the conveyor in one or more conveyor segments downstream of the first conveyor segment.

6. The method of claim 5 further comprising accelerating the articles in the first direction while centering.

7. The method of claim 1 further comprising rotating article-supporting rollers in a conveyor segment downstream of the first conveyor segment in a direction to direct conveyed articles toward the first side of the conveyor.

8. A method for singulating laterally abutting conveyed articles advancing in a general conveying direction along a conveyor, comprising:
   feeding laterally abutting articles onto an upstream portion of a first conveyor segment divided across its width into a first conveyor section having article-supporting rollers arranged to rotate to push conveyed articles in a first direction and a second conveyor section having article-supporting rollers arranged to rotate to push conveyed articles in a second direction oblique to the first direction, downstream and away from the first conveyor section toward a first side of the conveyor;
   separating laterally abutting articles by pushing those articles on the second conveyor section toward the first side of the conveyor and with a downstream speed less than the downstream speed of those articles on the first conveyor section.

9. The method of claim 8 wherein the first direction is parallel to the general conveying direction.

10. The method of claim 8 wherein the rollers in the first conveyor segment are advanced in the conveying direction at the same speed.

11. The method of claim 8 wherein the rollers in the first conveyor segment are stationary.

12. The method of claim 8 further comprising centering conveyed articles at preselected positions across the width of the conveyor in one or more conveyor segments downstream of the first conveyor segment.

13. The method of claim 12 further comprising accelerating the articles in the first direction while centering.

14. The method of claim 8 further comprising rotating article-supporting rollers in a second conveyor segment downstream of the first conveyor segment in a direction to direct conveyed articles toward the first side of the conveyor.

15. A method for singulating laterally abutting articles conveyed downstream along a conveyor, comprising:
   conveying articles in a general conveying direction on a first diverging roller conveyor segment having article-supporting rollers arranged to push some of the articles toward the first side of the conveyor and away from the other articles;
   conveying the articles on a centering roller conveyor segment downstream of the first diverging roller conveyor segment having article-supporting rollers arranged to push the articles to merge along an axis between the first and second sides of the conveyor.

16. The method of claim 15 further comprising conveying the articles on a second diverging roller conveyor segment downstream of the first diverging roller conveyor segment having article-supporting rollers arranged to direct some of the articles toward the second side of the conveyor and away from the other articles.

17. The method of claim 15 wherein the article-supporting rollers on the diverging roller conveyor segment along one of the two sides of the conveyor are arranged as in-line rollers and the article-supporting rollers on the other side of the conveyor are arranged as oblique rollers.

18. The method of claim 15 wherein the article-supporting rollers on the diverging roller conveyor segment along one of the two sides of the conveyor are arranged to rotate with a downstream component of velocity greater than that of the article-supporting rollers on the other side of the conveyor.

19. The method of claim 15 further comprising providing the diverging roller conveyor segment with a side wall frictionally engaging articles directed against the side wall with enough friction to slow the advance of the articles downstream.

* * * * *